Patented Nov. 28, 1939

2,181,640

UNITED STATES PATENT OFFICE 2,181,640

PROCESS AND PRODUCTS RELATING TO PRODUCTION OF VALUABLE HYDROCARBONS

Richard M. Deanesly and Aaron Wachter, Berkeley, Calif., assignors to Shell Development Company, San Francisco, Calif., a corporation of Delaware No Drawing. Application August 26, 1935,
Serial No. 37,942

11 Claims. (Cl. 260—676)

This invention relates to the inter-polymerization of dissimilar olefines and to the resulting and, in many cases, novel unsaturated inter-polymerization products thereby obtainable, and it further relates to the hydrogenation of unsaturated inter-polymerization products and to the resulting novel saturated branched chain hydrocarbons and mixtures thereof which are of particular value as motor fuels and as components of motor fuel and lubricating oil compositions.

The invention provides a practical and economical process for the production of valuable saturated as well as unsaturated higher boiling hydrocarbons from olefines or olefine-containing mixtures which comprises subjecting a mixture of dissimilar olefines, at least one of which is preferably a tertiary base olefine, to treatment, preferably in the presence of a polymerization agent, at a temperature and pressure and for a time sufficient to effect substantial inter-polymerization of a tertiary base olefine with a dissimilar olefine, removing at least a part of the polymer product, and hydrogenating at least a part of the inter-polymerization product by treating it with hydrogen in the presence of a hydrogenation catalyst under conditions at which hydrogenation occurs at a practical rate while undesirable side reactions as cracking and depolymerization are substantially obviated.

It is known that the lower olefines may be polymerized to higher boiling unsaturated co-polymers by treating them under certain polymerization conditions. The known polymerization processes involve the reaction of an olefine with an identical olefine or with a co-polymer of said identical olefine by a mechanism which is termed "co-polymerization." The process of the present invention is not one of co-polymerization. We have found that under conditions as hereinafter described we may react a tertiary base olefine with ethylene, with a secondary base olefine or with a tertiary base olefine containing a different number of carbon atoms to form at least one branched chain mono-olefinic hydrocarbon containing the elements of the interacted olefines. Our process is one of inter-polymerization and the term "inter-polymerization" is used herein and in the appended claims to designate the reaction of an olefine with a dissimilar olefine in accordance with the invention. In the course of the inter-polymerization reaction as, for example, when a tertiary base olefine is reacted with a secondary base olefine, some co-polymerization of both olefines or at least of the more reactive tertiary base olefine may also occur, resulting in a product containing one or more co-polymers in addition to the desired inter-polymerization product or products. However, by suitable control of the relative molecular proportions of the interacting olefines present in the reaction mixture, and by control of the reaction conditions, we may execute the invention to obtain a product materially predominating in the desired inter-polymerization product or products.

A tertiary base olefine is an olefine which contains an unsaturated tertiary carbon atom, that is, a carbon atom linked by three of its bonds to three other carbon atoms. A secondary base olefine is characterized by the possession of two vicinal unsaturated secondary carbon atoms as in butene-2, or by the possession of an unsaturated secondary carbon atom vicinal to an unsaturated primary carbon atom as in propene, butene-1, etc. Ethylene, which contains two unsaturated primary carbon atoms, is the only primary base olefine. The tertiary, secondary and primary base olefines on hydration yield, respectively, tertiary, secondary and primary derivatives. Due to isomerism which occurs under some conditions of inter-polymerization, the secondary base amylene, isopropyl ethylene (2-methyl butene-3) acts as a tertiary base olefine, and for the purposes of the present invention said compound is, in the majority of cases, equivalent to a tertiary base olefine.

Olefines may be dissimilar in that they possess a different number of carbon atoms to the molecule, or they may possess the same number of carbon atoms and be dissimilar as regards structure or position of the olefinic linkage. As examples of inter-polymerizations within the scope of the invention, we may polymerize a tertiary base olefine with ethylene, with a secondary base olefine of the same or a different number of carbon atoms, or with a dissimilar tertiary base olefine, preferably one containing a different number of carbon atoms to the molecule.

A group of suitable tertiary base olefines includes isobutylene (2-methyl propene-1), the amylenes as 2-methyl butene-1, 2-methyl butene-2 and 2-methyl butene-3, the hexylenes as 2-methyl pentene-1, 2-methyl pentene-2, 3-methyl pentene-2, 2,3-dimethyl butene-1, and 2,3-dimethyl butene-2, the heptylenes as 3-methyl hexene-2, 3-methyl hexene-3, 3-ethyl pentene-2, 2,3-dimethyl pentene-2, 2,4-dimethyl pentene-1, 2,4-dimethyl pentene-2 and 2,3,3-trimethyl butene-3, the octylenes as 4-methyl heptene-3, 3- methyl-3-ethyl pentene-2, 2,2,4-trimethyl pentene-3, 2,2,4-trimethyl pentene-4, etc., and the tertiary base nonylenes, decylenes, undecylenes and the like.

Suitable secondary base olefines which may be inter-polymerized with one or a mixture of tertiary base olefines include among others propene, the butylenes as butene-1 and butene-2, the amylenes as pentene-1, pentene-2 and 2-methyl butene-3, the hexylenes as hexene-1, hexene-2, hexene-3, 2 methyl pentene-4, 2-methyl pentene-3 and 3-methyl pentene-4, the heptylenes as heptene-1, heptene-2, heptene-3, 2-methyl hexene-5, 2-methyl hexene-4, 2-methyl hexene-3, 3-methyl hexene-5, 3-methyl hexene-4 and the like and the secondary base octylenes, nonylenes, decylenes and higher secondary base olefines. It is to be understood that we may also effect the inter-polymerization of a secondary base olefine with a dissimilar secondary base olefine, an olefine with an inter-polymerization product of said olefine, or another inter-polymerization product, or with a co-polymer of another olefine, and, in some cases, we may react a co-polymer of one olefine with the co-polymer of a dissimilar olefine. It is pointed out that although a secondary base olefine may be inter-polymerized with a dissimilar secondary base olefine the yields are relatively lower and more rigorous reaction conditions are necessitated and, accordingly, we prefer to execute the invention employing at least one tertiary base olefine.

The present process provides for more effectively utilizing the olefinic constituents of commercial hydrocarbon mixtures, particularly those occurring in the products of petroleum and petroleum cracking processes, to produce valuable derivatives therefrom and it may also be applied to the individual olefines, which olefines may be produced in the desired degree of purity by special chemical or physical methods or recovered from their mixtures by suitable means as absorption, extraction, fractionation and the like.

The olefine-containing mixtures may be obtained by effecting the pyrogenesis or cracking of petroleum oil, shale oils, and petroleum products, and by the destructive distillation of coal, peat, pitches, asphalts, animal and vegetable oils and the like carbonaceous material. Substantially pure olefines or mixtures thereof may be obtained by effecting dehydration of the corresponding alcohols or by decomposing acid liquors and by other suitable means. Mixtures of the desired olefines with one or more substantially inert materials as nitrogen, paraffins, etc., may be treated without separating the olefines therefrom.

In utilizing cracked petroleum, cracked petroleum distillates and the like olefine-containing material, it may be desirable to fractionate the same into fractions which, for the most part, contain the same number of carbon atoms to the molecule. Typical fractions of this sort are the propane-propylene fraction, the butane-butylene fraction, the pentane-amylene fraction and the like. If desired, the olefines or a particular olefine may be separated from such a cut or the original mixture by any of the known means as, for example, by selective absorption.

The invention is particularly directed to the inter-polymerization of selected olefines, and at least a part of the olefine content of selected olefine-containing mixtures to obtain unsaturated higher boiling products or mixtures thereof, and also the corresponding saturated products or mixtures thereof resulting from their hydrogenation, which boil within the approximate range of commercial motor fuel, say, for example, from about 35° C. to about 210° C., although higher boiling products up to and including the lub-oil range and higher may be obtained if desired. We have found that the inter-polymerization products of propylene and the secondary base butylenes and amylenes with isobutylene, the tertiary base amylenes, the tertiary base hexylenes and the tertiary base heptylenes boil within the desired motor fuel range and, further, that such inter-polymerization products and mixtures thereof and their hydrogenation products and mixtures thereof have very desirable anti-knock qualities. As an example of a mode of executing the invention, we may treat a commercial butane-butylene cut which contains isobutylene and secondary base butylenes in accordance with our process, and obtain excellent yields of branched chain octylene inter-polymerization products. If the isobutylene content of the initial mixture were co-polymerized to diisobutylene in a yield of 100%, there would be formed 0.83 gallon of diisobutylene per gallon of isobutylene. If the diisobutylene were then hydrogenated, 0.875 gallon of iso-octane (2,4,4-trimethyl pentane) would be obtained per gallon of isobutylene. In actual practice, by the known methods comprising absorption of the isobutylene in sulphuric acid and subsequent heat treatment of the acid liquor, losses in yield would reduce the amounts of product to about four fifths of the above figures. The secondary base butylenes (butene-1 and butene-2), if converted in a yield of 100% to dimers by co-polymerization and the dimers hydrogenated, would yield approximately the same number of gallons of octanes per gallon of secondary base butylenes as were obtained by co-polymerizing one gallon of isobutylene and hydrogenating. But as the secondary base butylenes are less reactive, under the more severe conditions necessary to effect their co-polymerization, the practical yields of dimers and hydrogenated dimers will be even less than the four fifths of the theoretical obtainable when working with isobutylene. Further as to the motor fuel qualities of the hydrogenated secondary butylene dimers as compared with iso-octane (2,4,4-trimethyl pentane), it is found that the former have an "octane number" of 86 as compared with 100 for iso-octane (A. S. T. M. test method No. D 357-34T).

The limitations of the known methods of co-polymerization are governed by the above facts, the numerical value of the yields and the motor fuel quality of the product varying somewhat depending upon the particular olefine but always showing both yield and quality of the motor fuel by co-polymerization of tertiary base olefines higher than are obtainable from secondary base olefines of the same number of carbon atoms. It is an object of this specification to show that the combined yield and quality of the product obtained by the inter-polymerization process of the present invention is not only greater than that of the product of processing a tertiary base olefine-containing mixture in such a way as to convert only the tertiary base olefines by co-polymerization and hydrogenation to a motor fuel, but is also greater than that of the product of processing a mixture containing tertiary base olefines and secondary base olefines by methods of co-polymerization whereby a blend of the hydrogenated co-polymers of the tertiary base and secondary base olefines is obtained. As an example of a special case, we show that if we cause one gallon of isobutylene to inter-polymerize with one gallon of secondary butylene and hydrogenate the product in accordance with our invention, we obtain more gallons of a better quality product than if we co-polymerize the one gallon of isobutylene and then in a separate operation co-polymerize the one gallon of secondary butylene and blend and hydrogenate the resultant co-polymers.

Anti-knock motor fuels and components of motor fuel mixtures can be more economically prepared from olefines by our method than by the known methods involving only the co-polymerization of the individual olefines. As an example of a mode of executing our invention, we may blend a propane-propylene cut with a butane-butylene cut so that the mixture contains one mol or less of isobutylene to every mol or more of secondary base olefines (propene, butene-1 and butene-2, and treat the mixture preferably in the presence of a polymerization agent, under inter-polymerization conditions, to obtain a mixture of branch-chain heptylenes and octylenes, which mixture may be hydrogenated in accordance with the invention to yield a high anti-knock paraffin mixture. The heptylenes and octylenes are formed in an amount substantially as indicated by the completion of the reactions:

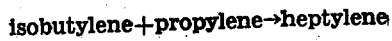
isobutylene+propylene→heptylene

isobutylene+secondary butylene→octylene

A third reaction representing the inter-polymerization of secondary butylene with propylene to form a tertiary base heptylene may also occur. However, in the presence of isobutylene and under the conditions of the operation this latter reaction occurs to a very small extent if at all.

The inter-polymerization reaction is preferably executed in the presence of a polymerization agent which accelerates the reaction and permits the use of relatively lower operating temperatures and pressures. We have found that a wide variety of compounds and elements are capable of exerting the requisite catalytic action. The particular polymerizing agent to be employed will be dependent upon the particular olefines reacted, upon the conditions under which the inter-polymerization is to be effected, upon the cost and availability of the particular agent or agents, and, to a certain extent, upon the choice of the operators. Many times the choice of a suitable agent will depend on whether a vapor or liquid phase method of inter-polymerization is to be employed.

When liquid phase methods are resorted to, preferance is given to those polymerization agents, per se or in solution or suspension, which may also serve as media for the extraction, absorption or solution of the olefines. Excellent results can generally be obtained by employing the mineral acids as HCl, HBr, HI, HF, $H_2SO_4$, $H_2S_2O_7$, $H_3PO_4$, $H_4P_2O_6$, $H_4P_2O_7$, $H_3PO_3$, $H_4P_2O_5$, $HPO_3$, $H_3PO_2$, $H_3AsO_4$ and the like as well as their anhydrides. The phosphoric and phosphorous acids are suitable polymerization agents and they may be very advantageously employed in the liquid phase or in a substantially solid state in admixture with a solid siliceous or similar absorbent material. We may also employ the organic acids as benzene sulphonic acid and its homologues and analogues. Mixtures of mineral acids and mineral acid salts with organic acids as zinc chloride-acetic acid, boric acid-oxalic acid and the like are useful. In addition, the acid-acting salts as $ZnSO_4$, $CdSO_4$, $PbSO_4$, $BiOCl$, $Cu_3(PO_4)_2$ and the like are suitable agents which are preferably employed in solution or suspension in water or in the material treated or in any other suitable medium.

Another suitable class of polymerizing agents which may be used in liquid as well as vapor phase operations, but which are particularly suitable for the latter, includes the inorganic halides as $AlCl_3$, $ZnCl_2$, $MgCl_2$, $FeCl_3$, $NiCl_2$, $BeCl_2$, $BeF_2$, $AsF_5$, $SbF_5$, $SnCl_4$, $TiCl_4$, $PF_5$, $BF_3$ and the like. In some cases, the condensing agents of this type are more advantageously employed in conjunction with a metal, as for example, zinc, aluminum or a metal of the eighth group of the Periodic table and, in some cases, such metals alone are suitable agents.

In some instances, the absorptive materials as silica gel, alumina, activated charcoal, fuller's earth, kieselguhr, Death Valley clay, bentonite, activated aluminum hydrosilicate and similar partially hydrated silicates and silicic acid compounds are suitable as polymerization agents. It may be desirable to use the above absorptive materials in conjunction with the acidic and/or halide polymerization agents above mentioned, or the latter may be precipitated on or otherwise incorporated on the surface of the latter. As an example, excellent results may be obtained by employing a solid agent comprising a calcined mixture of a phosphoric acid and a siliceous material as kieselguhr or pumice. The polymerization agents may be used independently of each other or in various combinations with each other as desired.

The inter-polymerization step of our process may be executed with the individual olefines or a mixture containing the olefines, and which may also contain one or more relatively inert substances, in the liquid, vapor or liquid-vapor state. Contact with a selected polymerization agent may be effected in any suitable manner and under the desired conditions of temperature, pressure and contact time. For example, the reactants may be agitated in contact with the polymerization agent in a common vessel at the desired pressure, or a mixture comprising the reactants and a suitable polymerization agent may be passed through suitable tubes or reaction coils maintained at the desired temperature. When solid agents or agents deposited on solid materials are employed, the reactants, severally or in admixture, in either the liquid or vapor phase, may be passed into contact with said catalyst mass maintained at the desired temperature. When vapor phase methods are resorted to, the solid agent in the form of pellets, granules and the like may be packed into suitable tubes and employed in manners customary in reactions of this sort.

In general, we prefer to effect the inter-polymerization under pressures greater than atmospheric since the higher pressures favor polymerization reactions of this type and permit reaction at practical rates at temperatures at which undesirable side reactions are substantially obviated. It is, however, to be understood that atmospheric or subatmospheric pressures may be used when desirable.

The time of contact required for the inter-polymerization of the dissimilar olefines is dependent on the character of the olefines involved, the nature and relative amount or concentration of the polymerization agent used as well as upon the other conditions of operation. It is desirable that the polymerization agent be selected and the contact time, pressure and temperature be adjusted to the character and quantity of the more reactive olefine or olefines present so that the desired inter-polymerization occurs in preference to co-polymerization of the individual olefines.

Usually we prefer to execute the invention with the less reactive olefine or olefines present in the treated mixture in molecular excess over the more reactive olefine or olefines. Since the tertiary base olefines are in general possessed of greater activity than the secondary base olefines, even those containing the same number of carbon atoms, the inter-polymerization of a tertiary base olefine with ethylene or a secondary base olefine is usually effected with the latter in substantial excess of the former. The relative proportions employed in any particular case will be dependent upon whether or not co-polymerization is also desired, upon the relative activity of the reactants, upon the selective action of the polymerization agent and upon the conditions of operation as temperature, pressure and contact time. As an example of a suitable means of controlling the relative proportions of the reactants and obtaining substantially only the desired inter-polymerization products, we may blend a commercial butane-butylene fraction with a propane-propylene fraction in such amounts that the mixture contains about 1 to about 1.5 mols of secondary base olefines (propylene, α and β-butylenes) to each mol of isobutylene present. Treatment of such a mixture in accordance with the invention results in excellent yields of a mixture of 7 and 8 carbon atom inter-polymerization products. So long as we have available as raw material an excess, however slight, of secondary base olefine over tertiary base butylene, we may adjust the ratio of tertiary base olefine to secondary base olefine in the inter-polymerization zone in such a manner as to favor inter-polymerization by recycling a part of the excess of unreacted secondary base olefine to the inter-polymerization zone; this is a variation of procedure which may be advantageously employed in certain cases for purposes of more efficient control.

When the inter-polymerization is effected in the liquid phase in the presence of a polymerization agent which also acts as a medium for the absorption of the olefines as, for example, an aqueous solution or suspension of mineral oxyacids as sulphuric, phosphoric, phosphorous, sulphonic, etc., the olefines may be absorbed in said medium, severally or in admixture, in the required amounts and the mixture subjected to inter-polymerization conditions as, for example, by increasing the temperature. The process may also be executed by passing a suitable mixture of the olefines into such an absorption medium maintained at a temperature at which absorption and inter-polymerization are substantially simultaneous. If desired one olefine may be first absorbed until the acidity is decreased to a predetermined minimum, the solution heated to a temperature below that at which substantial co-polymerization occurs but sufficiently high to effect inter-polymerization when a dissimilar olefine of the requisite reactivity is contacted therewith, and contacting said dissimilar olefine therewith until substantially all of the initially absorbed olefine has been inter-polymerized. When an olefine or mixture of olefines is absorbed in a solution or suspension of a polymerization agent, care is taken to avoid substantial co-polymerization.

If desired, each olefine may be absorbed in a separate batch of acid under conditions most suitable and the acid liquors then mixed and the mixture treated under conditions at which the desired inter-polymerization occurs at a practical rate. We may also start with the alcohols corresponding to the olefines to be inter-polymerized, and treat the mixture of alcohols with, for example, a concentrated sulphuric acid under conditions at which dehydration of the alcohols and subsequent inter-polymerization of the resulting olefines occurs, while the substantial formation of co-polymers is avoided.

When vapor phase methods of inter-polymerization are resorted to, the polymerization agent in the solid state or deposited on or incorporated with a suitable carrier, may be packed into a suitable reaction tube and maintained at the desired temperature while the mixture containing at least two dissimilar olefines is passed into contact with said agent at the desired space velocity and under the desired pressure. Only simple equipment is necessary such as a reaction tube or reaction tower in which the solid agent is employed as packing. If desired the olefines, severally, or a mixture containing them, may be preheated to a suitable temperature prior to their passage through the catalyst mass. External heating of the reaction tube may be resorted to when necessary or desirable. Many times, due to the heat liberated during the course of the reaction, external heating is not required and external cooling may even be desirable. Temperature of about 60° C. to about 250° C. may usually be employed with excellent results. In some cases, higher or lower temperatures may be employed. If the temperatures and pressures are such that the products exist in the vapor phase, the olefine-containing mixture may be passed through horizontal reaction tubes or the flow of the gases through the polymerization agent may be upward through packed tubes or towers, while if the products exist in the liquid state under the conditions of their formation, more advantageous results may be obtained when down flows are used so that liquid does not accumulate on the polymerization agent.

When employing polymerization agents in the solid form, the process is not limited to the treatment of the olefinic material in the gaseous state. The process may be advantageously executed at such pressures that at the desired temperature of operation both feed and product are in the liquid state. Under such conditions, the process may be executed, with or without resorting to mechanical agitation, in many forms of apparatus. In the case of the butylenes, excellent results were obtained by causing the liquid mixture of butylenes to percolate through a tube about 60% of the volume of which was packed with a solid polymerization agent in the form of granules.

Our invention may be executed in a batch, intermittent or continuous manner. The inter-polymerization stage may be in communication with a hydrogenation stage. The materials leaving the former may be continuously conducted to the latter wherein the desired degree of hydrogenation is effected.

The hydrogenation of the inter-polymerization products and mixtures thereof is executed in the presence of a hydrogenation catalyst chosen with respect to the compound or mixture of compounds to be hydrogenated, and the optimum conditions of its employment, so as to permit substantial hydrogenation at a practical rate under conditions at which undesirable side reactions as decomposition, depolymerization and the like are substantially obviated.

Excellent results may be obtained by employing the relatively inexpensive and readily regenerated base metal catalysts which possess the desired degree of activity. For example, the metals as nickel, iron, cobalt, copper, chromium and thallium are particularly active and efficacious catalysts when employed in a finely divided state or deposited on a suitable carrier. The oxides of the metals, particularly the oxides of nickel, cerium, thorium, chromium and zirconium or mixtures comprising two or more metal oxides or one or more metal oxides with one or more metals, have been found useful as catalysts and components of catalyst mixtures. In some cases, compound catalysts comprising two or more metals in admixture or alloyed as, for example, silver-copper, copper-chromium, copper-zinc, nickel-cobalt, nickel-zinc, etc. are valuable catalysts. We have found the compounds, molybdenum sulphide and molybdenum phosphate to be useful as sulphactive catalysts and components of sulphactive catalyst mixtures. Although the base metal catalysts are generally preferred, we may advantageously employ catalysts of the desired activity selected from the group consisting of the noble metals as silver, gold, platinum, palladium, osmium, ruthenium, rhodium and iridium.

The catalysts may be prepared by any suitable method and employed severally or in combination or admixture. The metallic catalysts are preferably preformed and employed per se. Any of the catalysts may be incorporated with or deposited on a relatively inert substance or carrier as pumice, charcoal, alumina, silica gel, kieselguhr and the like. In many cases, the activity of a selected catalyst may be considerably enhanced by incorporating therewith small quantities of other substances capable of acting as promoters. A class of suitable promoters includes the high melting and difficultly reducible oxygen-containing compounds, in particular, the oxides and oxygen-containing salts of elements as the alkaline earth and rare earth metals, beryllium, magnesium, aluminum, copper, thorium, manganese, uranium, vanadium, columbium, tantalum, chromium, boron, zinc and titanium. A particularly suitable group of promoters includes the difficultly soluble phosphates, molybdates, tungstates and selenates of the above listed metals, or the oxygen-containing reduction products of such compounds as, for example, the selenites.

We have found that the unsaturated inter-polymerization products can by hydrogenated with excellent results employing a pyrophoric nickel metal catalyst. A pyrophoric nickel catalyst of great activity may be conveniently and economically prepared by effecting the reduction and/or thermal decomposition of nickel salts of volatile organic acids. For example, nickel formate may be reduced and/or decomposed to an active catalyst by heating it in an atmosphere of hydrogen or an inert gas at a temperature of from about 200° C. to about 350° C., or the nickel formate may be dissolved or suspended in a suitable liquid as the material to be hydrogenated, the hydrogenation product, an inert petroleum oil, hydrocarbon and the like and the mixture heated to the decomposition temperature of the nickel formate in the presence or absence of a reducing or substantially inert gas.

The temperature at which hydrogenation is effected will be dependent upon the particular compound or mixture hydrogenated, upon the activity of the selected catalyst, upon the stability of the reactants, upon the contact time of the reactants and, to a certain extent, upon the pressure to be employed. Since undesirable side reactions are usually accelerated at the higher temperatures, we prefer to operate at temperatures not exceeding about 500° C., although, in some cases, higher temperatures may be used if care is taken to avoid the occurrence of decomposition reactions. When nickel and catalysts of like activity are employed, temperatures of from about 150° C. to 300° C. are suitable. With some of the noble metal catalysts as, for example, colloidal palladium, hydrogenation may be effected at a practical rate at room temperature. With the more common base metals, temperatures greater than about 100° C. are generally desirable.

Any suitable pressure may be used depending upon the catalyst, the temperature, the material treated and upon whether reaction is effected in the liquid or vapor phase. When vapor phase methods are employed, the vapors of the material to be hydrogenated together with hydrogen or a suitable hydrogen-containing gas are passed under the desired pressure and at a suitable space velocity into contact with the catalyst maintained at the desired reaction temperature. The fluids leaving the reaction chamber may be cooled and the condensed material conducted to a recovery stage wherein separation of the hydrogenated material, from other materials if they are present, may be effected by distillation, extraction and the like means. When the material to be hydrogenated is unstable at its atmospheric boiling temperature, subatmospheric pressures are advantageously used.

Generally, we prefer to effect the reaction in the liquid phase under a pressure greater than atmospheric. In most cases, pressures of from about 100 to about 1000 lbs./sq. in. are suitable, although higher or lower pressures may be used when necessary or desirable. The reactants and, if desired, one or more relatively inert materials as nitrogen, hydrocarbons, carbon dioxide, etc., may be charged, severally or in admixture, to a suitable reaction vessel. A suitable reaction vessel may be an autoclave equipped with means for agitating its contents as by mechanical stirring. Stirring or other means of agitation serves to maintain the catalyst in suspension. The catalytic material in the required amount may be added before, during or after introduction of the reactants. When the pyrophoric metal catalysts are used, it is desirable to substantially avoid its exposure to the air at all times. The amount of the catalyst to be used will be dependent upon the material to be hydrogenated and upon the activity and nature of the catalyst. When finely divided nickel is used, the catalyst is generally applied in an amount equal to about 1% to about 5% by weight of the material to be hydrogenated. However, considerable variation in this proportion may be made.

Substantially pure hydrogen from any source may be employed or we may use hydrogen-containing gases as purified coke oven gas, cracked oil gas and the like as well as gases obtained in the dissociation of ammonia, the dehydrogenation of alcohols, etc. The presence of substantially inert materials as nitrogen, hydrocarbons and the like is not detrimental. In addition to the economies realized in the use of such by-product gases, the presence of the diluent material may be advantageous as an aid to temperature control.

If desired, the material to be hydrogenated may be mixed with a dehydrogenatable oxy-compound as an alcohol and the mixture treated in the presence of a catalyst under conditions at which simultaneous hydrogenation and dehydrogenation occurs, the reaction involving an interchange of hydrogen whereby the unsaturated material is hydrogenated while the oxy-compound is dehydrogenated.

It is to be understood that the reactants should not contain substances as organic halides, sulphur and sulphur compounds in amounts sufficient to deleteriously effect the life and activity of the catalyst employed. The reactants, prior to hydrogenation, may be purified by any suitable means.

The following detailed examples are for the purpose of illustrating modes of executing our invention. It is to be understood that the invention is not to be considered as limited to the specific modes or conditions of operation disclosed. By a suitable modification of conditions and reactants, a wide variety of other compounds and mixtures may be prepared.

Example I

A hydrocarbon mixture containing branched chain octylenes was prepared in the following manner:

A mixture was made of anhydrous tertiary butyl alcohol, anhydrous secondary butyl alcohol, water and 95% sulphuric acid in such amounts that it had about the composition:

| | Per cent |
|---|---|
| $H_2SO_4$ | 44.3 |
| $H_2O$ | 15.1 |
| Tertiary butyl alcohol | 30.4 |
| Secondary butyl alcohol | 10.2 |

The above mixture was heated by passage through a tube immersed in boiling water at such a rate that the average heating time was about 20 minutes at a temperature of about 99° C.

The polymer recovered from the treated mixture amounted to about an 86.5% yield based on the input alcohols. This polymer product contained about 81% of dimers of which about 51.2% distilled below 110° C. while 48.8% distilled between 110° C. and 120° C. That this polymer product consisted for the most part of inter-polymerization products was shown by the fact that when the experiment was repeated using secondary butyl alcohol in place of tertiary butyl alcohol in the mixture no polymers were formed, instead the material leaving the reaction tube consisted for the most part of secondary butylene and unchanged secondary butyl alcohol. On the other hand, when the secondary butyl alcohol in the original mixture was replaced by tertiary butyl alcohol, co-polymerization resulted in octylenes boiling from 101° C. to 104° C., i. e. diisobutylene.

It is pointed out that a mixture having the composition as above given can just as well be made by absorbing isobutylene and secondary base butylenes in sulphuric acid.

Example II

A mixture of branched chain saturated nonanes was prepared by interpolymerizing isobutylene with trimethyl ethylene, separating the resulting mixture of unsaturated nonylenes, and effecting their catalytic hydrogenation in accordance with the following procedure.

About 74.1 gm. (10.0 mols) of tertiary butyl alcohol were added to about 117.2 gm. (13.3 mols) of tertiary amyl alcohol and about 134.6 gm. of 95% $H_2SO_4$ was added thereto and the mixture stirred and heated in an autoclave at a temperature of from about 80° C. to about 110° C. and under a pressure of about 100 to 150 lbs./sq. in. (gauge) until the dehydration and condensation reaction was substantially complete as indicated by a drop in pressure to about 10 lbs./sq. in.

At the end of this time the mixture of interpolymerization products and acid was cooled, the acid layer separated and the hydrocarbon layer neutralized, dried and fractionated. The product obtained was a novel mixture of novel nonylenes consisting for the most part of 3,5,5-trimethyl hexene-2, 2,4,4-trimethyl hexene-2 and 2,3,4,4-tetramethyl pentene-1.

The mixture of nonylenes was hydrogenated to a novel mixture of the corresponding novel saturated nonanes, by contacting it with hydrogen in the presence of an active nickel metal catalyst. The hydrogenation was effected in a metal autoclave equipped with heating and cooling means and means for agitating its contents by mechanical stirring.

The nickel catalyst was prepared by suspending nickelous formate in a neutral mineral oil and heating the mixture to a temperature of from about 280° C. to about 300° C. until substantially all of the nickelous formate was decomposed to a finely divided metallic nickel. The cooled mixture was centrifuged to settle the nickel. The nickel was employed in an amount equal to about 5% by weight of the material hydrogenated.

The hydrogenation was effected at a temperature of about 150° C. under a pressure of from about 200 to 250 lbs./sq. in. (gauge). The hydrogenation was complete in about 20 minutes.

The hydrogenation product was separated from the catalyst by decantation and filtration. The mixture of nonanes was found to be an excellent anti-knock motor fuel.

Example III

In a series of experiments, the results of which are hereinafter summarized, a butane-butylene stock having about the composition

| | Per cent |
|---|---|
| Isobutylene | 16.4 |
| Secondary butylenes | 28.6 |
| Butanes | 55.0 | was passed through a reaction tube having an inside diameter of about 1.5 inches and packed with about 3 lbs. of a solid catalytic material the active ingredient of which was ortho-phosphoric acid. The material to be treated was passed through the packed catalyst tube at such rates that substantially all of the isobutylene was reacted on one passage therethrough. The temperature of operation varied from about 120° C. to about 220° C. The pressure in the reaction tube was maintained at from about 400 to about 600 lbs./sq. in. The material was passed through the tube at the rate of from about 2 to about 10 gallons per hour.

The treated material leaving the reaction tube was collected and fractionated to separate the polymers from the unreacted butylenes and butane. The polymer material was then refractionated to effect the separation of the octylenes. The octylenes were then hydrogenated and their motor fuel quality (octane number) determined by the standard test method (A. S. T. M. No. D 357-34T).

To compare the octanes obtained with those obtainable by co-polymerization of the same olefines, a further experiment was made in which the recovered mixture containing secondary base butylenes, butanes and a negligible quantity of isobutylene was treated in the same apparatus. It was found that temperatures higher than 170° C. and pressures of over 600 lbs./sq. in. were necessary to effect any substantial co-polymerization of the secondary base butylenes. Even at a temperature of 220° C., the co-polymerization, as may be seen from the following data, was relatively slow and the reaction incomplete. The co-polymerization product obtained was treated in the same manner as the inter-polymerization product previously prepared. The pertinent data are given in the following table. For further comparison, the properties of the hydrogenated co-polymer of isobutylene, namely, iso-octane (2,2,4-trimethyl pentane) are also included in the table.

tanes obtained have an octane number of 95.5, whereas by co-polymerization of each olefine separately the blended octanes have an octane number of 93. A further advantage of operation in accordance with our invention is in contrast to methods of co-polymerization evident when it is taken into account that the practical yields by the co-polymerization process if applied to the secondary base butylenes involve both higher temperature and slower operation rates and even so are lower per unit of olefine treated.

In the execution of our invention, a wide variety of novel and useful mixtures comprising tertiary base unsaturated hydrocarbons are obtained. When a mixture of tertiary olefines or a single olefine is caused to inter-polymerize with a mixture of secondary base olefines, a mixture of dissimilar tertiary base olefines, a single secondary base olefine or a single dissimilar tertiary base olefine, the resulting mixture of branched chain unsaturated hydrocarbons is a novel composition of matter. The unsaturated inter-polymerization products obtained by inter-polymerizing a secondary base olefine with a dissimilar secondary base olefine, as well as the products obtained when one of the reactants is a tertiary base olefine, are all tertiary base olefines.

A valuable class of novel unsaturated hydrocarbons containing at least eight carbon atoms to the molecule and obtainable by inter-polymerizing a tertiary base olefine with a dissimilar olefine includes the compounds embracing the grouping

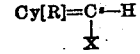

wherein $Cy$ represents a saturated quaternary carbon atom when R represents an alkyl chain of not more than two carbon atoms, and a tertiary carbon atom when R is zero, that is, when the $C^x$ carbon atom is linked directly to $Cy$, X representing a hydrogen atom when $Cy$ is tertiary and a hydrogen atom or an alkyl radical when $Cy$ is quaternary. When the carbon atom represented by $C^x$ is linked to only two other carbon atoms, R represents a single carbon atom. When $C^x$ is linked to three other carbon atoms by displacement of the H atom by an alkyl radi-

|  | By inter-polymerization | | | | By co-polymerization | | |
| --- | --- | --- | --- | --- | --- | --- | --- |
|  | | | | | 100% conversion of isobutylene | 100% conversion 1 mol isobutylene+1 mol sec. butylene | 100% conversion of 1 mol isobutylene+1 mol. sec. butylene by inter-polymerization |
| Run number | 1 | 4 | 6 | 5 |  |  |  |
| Rate of feed gal. B.B./lb. catalyst/hr | 0.694 | 0.654 | 3.52 | 1.02 |  |  |  |
| Temperature, ° C | 170 | 129-135 | 215-225 | 205-225 |  |  |  |
| Ratio $\frac{T}{T+S}$ converted* | 0.49 | 0.56 | 0.41 | 0.01 | 1.0 | 0.5 | 0.5 |
| Tertiary olefines reacted, percent | 95.0 | 95.4 | 85.0 |  | 100 | 100 | 100 |
| Secondary olefines reacted, percent | 55.0 | 42.6 | 50.5 | 70.6 | 0 | 100 | 100 |
| Percent octylenes of total reacted | 82.2 | 85.1 | 86.1 | 79.0 | 100 | 100 | 100 |
| Gallons octanes/gallon tertiary olefine reacted | 1.43 | 1.34 | 1.78 |  | 0.875 | 1.74 | 1.74 |
| Gallons octanes/gallon tertiary olefine fed | 1.36 | 1.28 | 1.51 |  | 0.875 | 1.74 | 1.74 |
| Gallon octanes/gallon total olefines fed | 0.50 | 0.47 | 0.46 | 0.43 | 0.875 | 0.87 | 0.87 |
| Octane number of octanes | 96.2 | 96.0 | 94.2 | 86.0 | 100 | 93 | 95.5 |
| Octane gallons/gallon tertiary olefine fed | 1.31 | 1.23 | 1.42 |  | 0.875 | 1.62 | 1.66 |
| Octane gallons/gallon total olefines reacted | 0.696 | 0.719 | 0.714 | 0.598 | 0.875 | 0.81 | 0.83 |
| Octane gallons/100 gallons of B.B. stock fed | 21.5 | 20.2 | 23.3 | †10.6 | 14.35 | 26.5 | 27.2 |

*$\frac{\text{Mols tertiary olefine}}{\text{Mols tertiary olefine+mols secondary olefine}}$
†Assuming same concentration of secondary butylene in feed as in other runs.

It will be seen from the tabulated data, that by inter-polymerization we have in practice obtained volumes of octanes from 46% to 72% greater than the volume of iso-octane theoretically (but not practically attainable) by 100% conversion of the isobutylene treated while the octane number is only lowered by about 4 to 6%. This represents a net gain in octane gallonage of from 40-60%. (Compare the octane gallons per 100 gallons of B. B. stock treated in runs 1, 4 and 6 with the 14.35 octane gallons per 100 gallons of B. B. stock fed if there was a 100% conversion of isobutylene). Further the gain by inter-polymerization, assuming 100% yield in both cases, over that obtained by co-polymerizing the same quantity of tertiary and secondary base olefines, is that by inter-polymerization the occal, R represents an alkyl chain containing at least two carbon atoms. Unsaturated inter-polymerization products of the above type may, for example, be obtained by reacting isobutylene (2-methyl propene-1) with pentene-1, with pentene-2, with 3-methyl butene-3, with hexene-1, etc.

The nonylenes obtained by reacting isobutylene with an amylene, a tertiary base hexylene with propylene, and a tertiary base heptylene with ethylene are new and useful compounds. As examples of these nonylenes, we may react isobutylene with 3-methyl butene-3 and obtain 2,2,4-trimethyl hexane; we may react 3-ethyl butene-3 with propylene and obtain 3-methyl-3-ethyl hexene-5 and 2-methyl-4-ethyl hexene-3 and we may react 2-methyl hexene-2 with ethylene and obtain 2-methyl-2-ethyl butene-3 and 2-methyl-3-ethyl hexene-2.

The novel unsaturated decylenes may be obtained by reacting a tertiary base amylene with a secondary base amylene, by reacting a tertiary base hexylene with a butylene, by reacting a tertiary base heptylene with propylene, by reacting a tertiary base octylene with ethylene and by reacting isobutylene with a hexylene. As examples of valuable and novel decylenes we may react 2-methyl butene-2 with pentene-2 and obtain 2,3-dimethyl-4-ethyl hexene-2 and 3,3, dimethyl-4-ethyl-hexene-4.

Novel undecylenes, dodecylenes and higher branched chain unsaturated inter-polymerization products may be prepared by reacting a tertiary base olefine with a dissimilar olefine containing the required number of carbon atoms. As an example of a member of a novel class of branched chain undecylenes we may react the tertiary base hexylene, 3-ethyl butene-3, with the tertiary base amylene, 2-methyl butene-2, and obtain the undecylenes, 5,5-dimethyl-3-ethyl heptene-3, 2, 3, 4-trimethyl-4-ethyl hexene-2 and the like.

The octane, 2,2,3-trimethyl pentane, is illustrative of a novel and useful saturated hydrocarbon which is obtainable in accordance with the invention by inter-polymerizing isobutylene with a secondary butylene and hydrogenating the resulting inter-polymerization product.

Novel saturated branched chain hydrocarbons containing at least nine carbon atoms to the molecule are obtainable by inter-polymerizing a tertiary base olefine with a dissimilar olefine and hydrogenating the resulting unsaturated inter-polymerization product. A valuable class of novel branched chain saturated hydrocarbons may be represented by the formula R—X, wherein R represents the radical

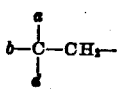

wherein $a$ and $b$ represent alkyl radicals and $d$ may be hydrogen or an alkyl radical, and X represents an alkyl chain which is normal and contains at least five carbon atoms when R contains four carbon atoms and which is normal and contains at least four carbon atoms when R contains five carbon atoms.

The following are illustrative of novel nonanes which may be prepared by hydrogenating the corresponding nonylenes obtainable by our method: 2,2,4-trimethyl hexane, 2,4,4-trimethyl hexane, 2,3,4,4-tetramethyl pentane, 2,2-dimethyl heptane, 2,2-dimethyl-3-ethyl pentane, 2-methyl-4-ethyl hexane, 3-methyl-3-ethyl hexane, 2,3,4-trimethyl hexane, 4,4-dimethyl heptane, etc.

The compound, 3,3,4-trimethyl heptane, obtainable by inter-polymerizing 2-methyl butene-2 with pentene-3 and hydrogenating the resulting inter-polymerization product, is illustrative of the novel decanes which may be prepared by our method.

As examples of novel undecanes, we may by hydrogenating the novel undecylenes obtainable by our method of inter-polymerization, obtain compounds as 3,3-dimethyl-5-ethyl heptane, 3,5-dimethyl-5-ethyl heptane, 2,3,4-trimethyl-4-ethyl hexane, 3,3,4,5-tetramethyl heptane, 2,3,4,4-tetramethyl heptane, 3,3,5-trimethyl octane, 3,5,5-trimethyl octane, etc.

Mixtures of unsaturated inter-polymerization products, which mixtures are in many cases useful per se for a wide variety of purposes, may be prepared in accordance with the invention as for example by treating a mixture of dissimilar olefines containing one or a plurality of tertiary base olefines and one or a plurality of secondary base olefines and/or ethylene. If desired, such a mixture may be treated and the individual products separated as by fractionation, condensation, extraction, absorption, etc., or the mixture may be hydrogenated to a novel mixture of saturated higher boiling hydrocarbons, which mixture may also contain one or more unsaturated inter-polymerization products. A novel mixture of branched chain heptylenes and octylenes may, for example, be prepared by subjecting a mixture containing isobutylene, secondary base butylenes and propylene to inter-polymerization conditions. If desired, a new and useful mixture of branched chain heptanes and octanes may be obtained by hydrogenating such a mixture of heptylenes and octylenes. As a further example, we may by inter-polymerizing isobutylene with a mixture of secondary base butylenes and hydrogenating at least a part of the polymer product obtain a novel mixture of branched chain octanes essentially comprising 2,2-dimethyl hexane, 2,4-dimethyl hexane, and 2,2,3-trimethyl pentane.

In addition to being valuable motor fuels and components of motor fuel and lubricating oil compositions, the inter-polymerization products and their hydrogenation products and mixtures thereof comprising saturated as well as unsaturated products are useful as solvents, as raw material for resin production, etc. The unsaturated compounds are particularly useful as starting material for the production of a wide variety of valuable organic compounds as alcohols, ethers, esters, acids, halides, halohydrins, glycols, oxides, amines, alkylolamines and the like.

While we have described our invention in a detailed manner and provided specific examples illustrating modes of operation and the types of products obtainable, it is to be understood that modifications may be made and that no limitations other than those imposed by the appended claims are intended.

We claim as our invention:
1. A process for the production of hydrocarbons boiling primarily in the gasoline range which comprises reacting a low boiling tertiary olefine with a dissimilar olefine of a different order of reactivity in the presence of an acidic polymerization catalyst at a temperature of from 60° C. to 250° C., the operation being conducted with the less reactive olefine in substantial molecular excess over the more reactive olefine and with at least one of the reactants in the liquid phase, removing the reaction product while the major portion thereof boils below the end-point of gaso- line, and hydrogenating at least a part of the removed reaction product.

2. A process for the production of hydrocarbons boiling primarily in the gasoline range which comprises reacting a low boiling tertiary olefine with a dissimilar secondary olefine in the presence of a substantial molecular excess of the secondary olefine and in the presence of an acidic polymerization catalyst at a temperature of from 60° C. to 250° C., with at least one of the reactants in the liquid phase, removing the reaction product while the major portion boils below the end-point of gasoline, and hydrogenating at least a part of the removed reaction product.

3. A process for the production of hydrocarbons boiling primarily in the gasoline range which comprises reacting a low boiling tertiary olefine with a dissimilar olefine of a lower order of reactivity in the presence of a substantial molecular excess of the less reactive olefine and in the presence of a solid acidic polymerization catalyst at a temperature of from 60° C. to 250° C. and with at least one of the reactants in the liquid phase, removing the reaction product while the major portion boils below the end-point of gasoline, and hydrogenating at least a part of the removed reaction product.

4. A process for the production of hydrocarbons boiling primarily in the gasoline range which comprises reacting a low boiling tertiary olefine with a dissimilar olefine of a lower order of reactivity in the presence of a substantial molecular excess of the less reactive olefine and in the presence of a liquid polybasic mineral oxy-acid polymerization catalyst at a temperature of from 80° C. to 110° C., removing the reaction product while the major portion thereof boils below the end-point of gasoline, and hydrogenating at least a part of the removed reaction product.

5. A process for the production of hydrocarbons boiling primarily in the gasoline range which comprises reacting a low boiling tertiary olefine with a dissimilar olefine of a lower order of reactivity in the presence of a substantial molecular excess of the less reactive olefine in the presence of sulphuric acid at a temperature of from 80° C. to 110° C., removing the reaction product while the major portion thereof boils below the end-point of gasoline, and hydrogenating at least a part of the removed reaction product.

6. A process for the production of hydrocarbons boiling within the gasoline range which comprises heating a liquid hydrocarbon mixture containing substantial amounts of isobutylene and secondary butylenes, with the latter present in substantial molecular excess over the former, in the presence of an acidic polymerization catalyst at a temperature of from 60° C. to 250° C., removing the reaction product while a major portion thereof boils below the end-point of gasoline, and hydrogenating at least a part of the removed reaction product.

7. A process for the interpolymerization of a tertiary olefine with a secondary olefine which comprises subjecting a hydrocarbon mixture containing the tertiary olefine and a substantial molecular excess of the secondary olefine to the action of a solid acidic polymerization catalyst at a temperature within the range of from 60° C. to 250° C. under a superatmospheric pressure and for a time sufficient to effect substantial interpolymerization.

8. A process for the interpolymerization of a tertiary olefine with a dissimilar olefine of a lower order of reactivity which comprises heating the tertiary olefine with a substantial molecular excess of the dissimilar olefine in the presence of an acidic polymerization catalyst under a superatmospheric pressure and at a temperature of from 60° C. to 250° C. for a time sufficient to effect substantial interpolymerization with no substantial decomposition of the olefinic reactants and products.

9. A process for the interpolymerization of a tertiary olefine with a secondary olefine which comprises heating the tertiary olefine with a substantial molecular excess of the secondary olefine in the presence of an acidic polymerization catalyst at a temperature in the range of from 60° C. to 250° C. for a time sufficient to effect substantial interpolymerization.

10. A process for the mixed polymerization of iso and normal butenes which comprises subjecting a mixture of iso butene and normal butenes to the action of a solid phosphoric acid catalyst at temperatures within the approximate range of 275–325° F., superatmospheric pressure of the order of 450 to 600 pounds per square inch and for a time sufficient to effect substantial interpolymerization.

11. A process for the mixed polymerization of iso and normal butenes which comprises subjecting a mixture of iso butene and normal butenes to the action of a solid phosphoric acid catalyst at temperatures within the approximate range of 275–325° F. superatmospheric pressure of the order of 450 to 600 pounds per square inch and for a time sufficient to effect substantial interpolymerization, and hydrogenating at least a part of the resulting polymerization product.

RICHARD M. DEANESLY.
AARON WACHTER.